(12) United States Patent
Decker

(10) Patent No.: US 7,751,695 B2
(45) Date of Patent: Jul. 6, 2010

(54) HIGH-SPEED MASSIVELY PARALLEL SCANNING

(75) Inventor: Derek E. Decker, Byron, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 277 days.

(21) Appl. No.: 11/818,189

(22) Filed: Jun. 12, 2007

(65) Prior Publication Data

US 2009/0116828 A1    May 7, 2009

Related U.S. Application Data

(60) Provisional application No. 60/813,306, filed on Jun. 12, 2006.

(51) Int. Cl.
    *G03B 37/02*   (2006.01)
(52) U.S. Cl. .......................................... 396/20; 396/24
(58) Field of Classification Search ................ 396/20, 396/24; 348/209.99
    See application file for complete search history.

(56) References Cited

U.S. PATENT DOCUMENTS

| | | | |
|---|---|---|---|
| 6,271,957 B1 | 8/2001 | Quate et al. | |
| 6,335,824 B1 | 1/2002 | Overbeck | |
| 6,495,813 B1 | 12/2002 | Fan et al. | |
| 6,649,312 B1 | 11/2003 | Chari et al. | |
| 6,943,831 B2 | 9/2005 | Gallagher | |
| 6,950,608 B2 | 9/2005 | Szajewski et al. | |
| 6,967,711 B2 * | 11/2005 | Gui ............................. | 355/67 |
| 7,061,581 B1 * | 6/2006 | De Jager ..................... | 355/53 |
| 7,116,402 B2 * | 10/2006 | Gui ............................. | 355/57 |
| 7,202,939 B2 * | 4/2007 | Gui et al. ..................... | 355/69 |
| 7,333,177 B2 * | 2/2008 | Gui ............................. | 355/67 |
| 2003/0043471 A1 | 3/2003 | Belser et al. | |
| 2005/0200821 A1 * | 9/2005 | Gui ............................. | 355/67 |
| 2006/0023190 A1 * | 2/2006 | Jager .......................... | 355/67 |
| 2006/0290914 A1 * | 12/2006 | Van Der Pasch et al. ...... | 355/67 |
| 2007/0242246 A1 * | 10/2007 | Gui et al. ..................... | 355/53 |
| 2007/0258078 A1 * | 11/2007 | Troost et al. ................. | 355/72 |

* cited by examiner

*Primary Examiner*—Rodney E Fuller
(74) *Attorney, Agent, or Firm*—John P. Wooldridge

(57) ABSTRACT

A new technique for recording a series of images of a high-speed event (such as, but not limited to: ballistics, explosives, laser induced changes in materials, etc.) is presented. Such technique(s) makes use of a lenslet array to take image picture elements (pixels) and concentrate light from each pixel into a spot that is much smaller than the pixel. This array of spots illuminates a detector region (e.g., film, as one embodiment) which is scanned transverse to the light, creating tracks of exposed regions. Each track is a time history of the light intensity for a single pixel. By appropriately configuring the array of concentrated spots with respect to the scanning direction of the detection material, different tracks fit between pixels and sufficient lengths are possible which can be of interest in several high-speed imaging applications.

30 Claims, 3 Drawing Sheets

HIGH-SPEED MASSIVELY PARALLEL SCANNING

RELATED APPLICATION

This application claims the benefit of U.S. Provisional Application No. 60/813,306, filed Jun. 12, 2006, and entitled, "HIGH-SPEED MASSIVELY PARALLEL SCANNING," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a measurement method and system. More particularly, the present invention is directed to an optical and mechanical scanning system for the capture of high-speed images.

2. Description of Related Art

High-speed imaging has a history filled with creative solutions for capturing ultra-short events with high spatial resolution, high dynamic range, and high temporal resolution. The most common methods over the years involve rotating mirrors (which quickly scan an image of the object to different regions of stationary film) or spinning drums (which rotate film at high-speed relative to a static image). Rotating mirrors are usually made of beryllium and are severely stressed by centripetal forces (from the high angular velocity) to the point that failures can and have occurred. Even if the exploding minor can be contained, beryllium dust is known to cause dangerous diseases when inhaled. Rotating mirror cameras, in addition to being dangerous, are expensive to purchase and operate, and have severe limitations in both temporal and spatial resolution.

There exist electronic methods to capture multiple images in which electrons in a CCD imaging camera chip are transferred from an exposed region to a masked region (interline transfer, frame transfer, etc.). However, this suffers from low resolution and/or low number of frames because all the image frames must share the real estate of one semiconductor chip (for example, a 16-megapixel CCD could store sixteen 1-megapixel images, or four 4-megapixel images, etc.). The Japanese company Shimadzu is marketing a 100 frame camera (for sports applications) in which each frame only has 312 by 260 pixels. Such cameras also suffer from poor dynamic range (for example, the Shimadzu camera provides less than 8 bits of grayscale, while film on the other hand can provide well over 16-bits (hundreds of times better dynamic range).

Yet another image capture method uses the Shaw Camera or Image Conversion Camera which gates an image of electrons (generated by an optical image upon a photocathode) by briefly accelerating these electrons with a large electric field (from a shaft high voltage pulse) toward a phosphor screen, wherein the image of electrons is converted back into an optical image (through luminescence) and recorded on film or a semiconductor detector array (CMOS, CCD, etc.). It does not matter that the luminescence can be slow, continuing to expose the detector after the gate is off, because the source image of electrons ceased when the high voltage was removed. The photocathode, however, must have a fast response to prevent integration "blurring" of the image which is quickly changing over time. One major disadvantage of this method includes the requirement for an electronic gate (proxifier or microchannel plate) and a detector array per frame. The cost is further increased by a low-jitter, high-voltage pulser required for each gate.

Multiplexed holography has also been employed for the capture of a series of brief exposures. As many as 10,000 images have been angle multiplexed into a single storage medium. The short exposure (to freeze motion) is controlled by using short and bright laser pulses. Holography, however, requires a rather special laser which has a single wavelength (typically a cavity-seeded, single longitudinal mode) and single transverse mode ($TEM_{00}$). Companies like InPhase Technologies are hoping to store a terabyte of data on a single CD ROM by employing various holographic multiplexing schemes and utilizing the inherently high throughput of writing two dimensional binary (not grayscale) images (with a spatial light modulator) and reading out the data one image at a time (with a two dimensional digital camera system).

Accordingly, a need exists for methods and apparatus to make high speed imaging systems more accessible to scientists, engineers and the general public through a system that is lower in cost, safer to operate, covers a longer event window (more image frames), and has higher dynamic range and higher spatial and temporal resolution. The present invention is directed to such a need.

SUMMARY OF THE INVENTION

Accordingly, the present invention is directed to an optical scanning apparatus to record transient events. By utilizing optical arrays to take image picture elements (pixels) of the transient event(s), the light from each pixel can be concentrated into a spot that is much smaller than the pixel to enable the storing of a large amount of data in an efficient manner.

Another aspect of the present invention is directed to a parallel scanning method that includes: producing a two dimensional array of spots having the image information of a transient event(s); and exposing an optically sensitive media via the two dimensional array of spots not along the direction of a row of the produced two-dimensional array of spots but along a predetermined tilt between the row and the surface of the optically sensitive media.

Accordingly, the present invention provides a compact, portable, low cost, high sensitivity, efficient system and method to store large amounts of data of greater than about ten gigabytes in less than about a tenth of a millisecond. The data simply needs to be entered into this system optically. The information is input into the device as a time varying array of pixels, each of which can record various intensity values, e.g., red, green and blue intensity values. Each array can be composed of millions pixels. Each pixel can resolve signals varying up to 10 MHz. and can record high cutoff frequencies. Such a system and method as disclosed herein does not require a complex and expensive laser to operate, can use light with a range of wavelengths to avoid graininess (e.g., speckle-like graininess caused by utilizing coherent illumination sources), and can record and play back the images in color with added adaptability of providing multiple views simultaneously (for stereo pairs) or in series (for additional recording time).

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
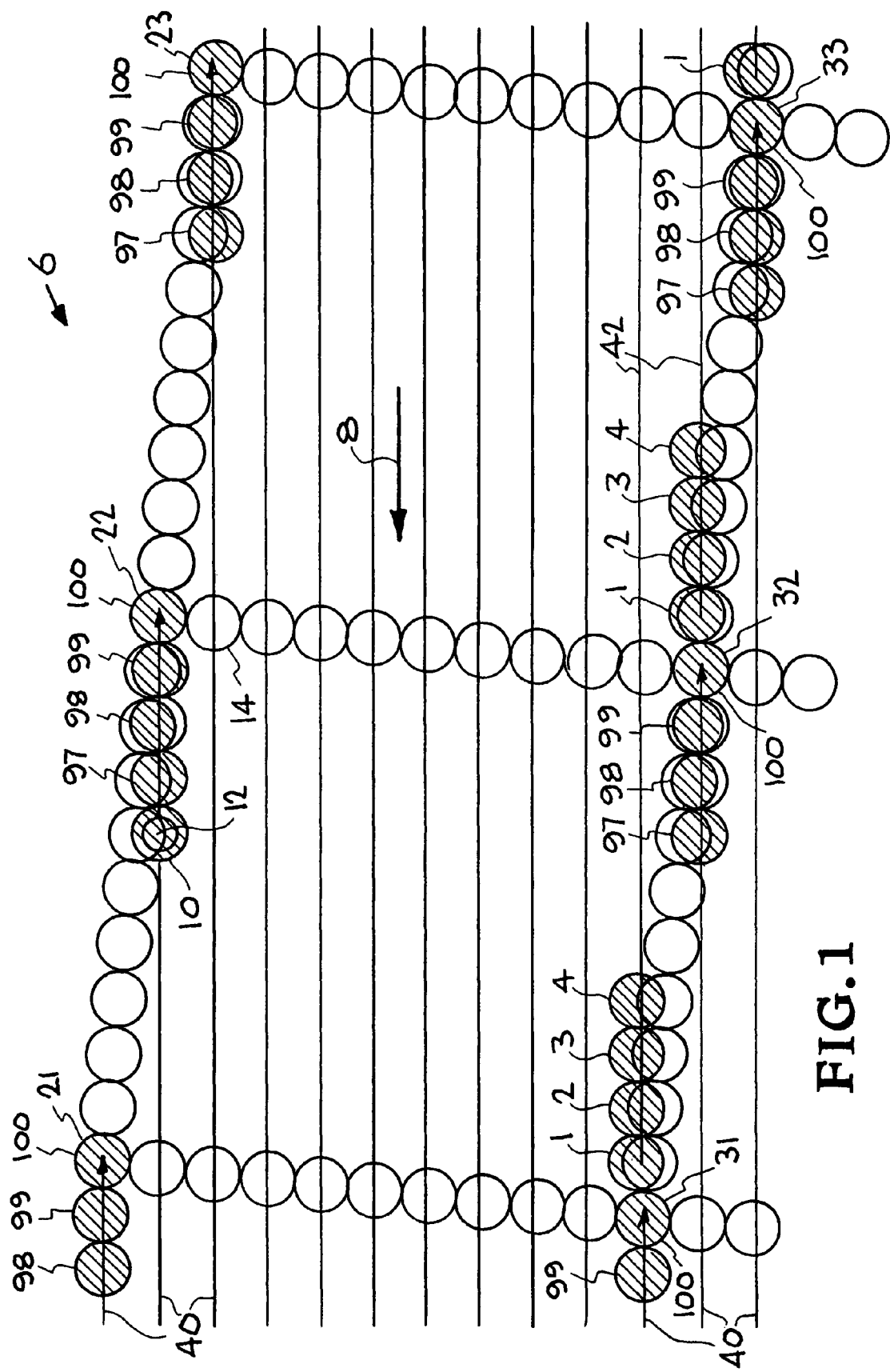
FIG. 1 illustrates a one hundred frame arrangement of the present invention between lenslet focus spots and recorded exposures on film.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Moreover, in the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

General Description

High-speed imaging has many industrial applications, including the study of objects moving so fast that motion blur prevents one from acquiring detailed images. Explosives, ballistics, chemical reactions and the "instant replay" in sports use high-speed imaging to determine what is actually happening by recording and replaying the action back in slow motion. There can be numerous applications in diagnosing fast moving machinery or assembly line products, physics modeling of shock waves, inferring equation of state values from velocimetry derived from high-speed images, determining projectile motion and impact fracture dynamics, understanding interactions between pulsed lasers and materials, recording the motion and performance of space re-entry vehicles, documenting automobile crash test results, studying the way a hummingbird hovers and even improving the execution of a golf swing.

Accordingly the present invention is directed to a new method and apparatus for optically recording a series of images that can produce a movie of high-speed events (transient events), wherein each image can include time varying intensity of one or more colors indicating independent time-varying information streams. In particular, the present invention utilizes an optical means, such as, but not limited a lenslet array, an array of fiber tapers, an array of hollow reflecting cones or pyramids (open at both the base and peak ends), a hologram, a diffractive device, a surface having an array of holes configured to control the exposure of said optically sensitive media, and/or other light concentrating means understood by those of ordinary skill in the art by which a two dimensional image of light is converted into a two dimensional may of spots whose fluence is increased relative to the input image fluence, thereby creating a two dimensional array of tightly focused and bright points, each representing the irradiance of a pixel in a greatly reduced area.

The spot size can be on the order of the wavelength of light using low f-number (high numerical aperture) lenslets. This leads to an increased fluence (energy deposited per unit area) during recording and this makes the system more sensitive (less light is required to exceed the recording threshold). If the concentration is high, e.g., from a lenslet or pixel diameter of about sixty microns to a spot diameter of about two microns, then the illumination is a sparse array, 0.111% (ratio of the square of the diameters) of the detector area. That leaves the other 99.9% available for storing data.

By selecting a direction in which a configured detector, e.g., a recording medium, such as, but not limited to: a silver halide film, a dichromated gelatin, a photoresist, a semiconductor material, and other photosensitive molecules deposited on the surface or otherwise forming the surface of such a configured detector, moves relative to a row of the array, e.g., at a predetermined angle configured for the system(s) disclosed herein, then the resultant tracks can be fit between points for some time. To illustrate such an arrangement, for an angle defined by arctan (1/30), 30 two micron wide tracks can be stacked within the sixty micron period between points. In this example, 900 (30×30) two micron points can be configured to make up the length (2700 microns or 2.7 mm) of each track before it runs into and begins to overwrite the next track. Thus, a 900 frame camera results with an inter-frame time determined by the time it takes to move the film two microns. With a film motion of twenty meters per second, which, for example, can be obtained in a rotating plate configuration, twenty microns have gone by in one microsecond. This is the equivalent motion of two microns in one hundred nanoseconds (100 ns) and that is the inter-frame time for such a system. Therefore, such an arrangement can produce a ten million frame per second camera, for which 900 frames are recorded over ninety microseconds. Thus, each image can contain well over a million pixels using the methods and apparatus as described herein.

Specific Description

Turning now to the drawings, a diagram that illustrates an exemplary embodiment of a system constructed in accordance to the designs of the present invention is shown in FIG. 1. The system, designated generally by the reference numeral 6 and capable of being designed as a portable compact apparatus illustrates the use of lenslet arranged focus spots (e.g., reference numerals 21, 22, 23, 31, 32, and 33) and the recorded exposures on the film (e.g., reference numerals 1, 2, 3, 4, 97, 98, 99, and 100). In the example arrangement of FIG. 1, there is a designed tilt of one part in ten between a designed film scanning direction 8 and any row (as denoted by the configured parallel lines in FIG. 1) of the array. Circles 14 are shown only to illustrate the angle and spacing of the array of spots. If the array is described with x and y coordinates in which [1, 1] locates an upper-left spot 21, then configured spot 22 has coordinates [2, 1], spot 23 has coordinates [3, 1], spot 31 has coordinates [1, 2], spot 32 has coordinates [2, 2], and spot 33 has coordinates [3, 2]. Such arranged spots do not move, rather the optically sensitive media, e.g., film, beneath the spots move, as shown by reference numeral 8 and the accompanying directional arrow.

It is to be appreciated that the exposures as shown in FIG. 1 can contain, based on the optical design, a less exposed region 10 which surrounds a more highly exposed region 12. In particular, a diffraction-limited exposure of a point source by a lenslet of the present invention can yield an intensity profile which better resembles a Gaussian shape having a substantial uniform illumination that results from the produced beam shape. It is to be noted however, that there is substantially no light beyond the configured spots, such as the six spots shown in FIG. 1, as illustrated as black circles 100 that are exposing the film at any given time.

In the example arrangement of FIG. 1 there are also one million spots expanding further to the right and down to form a 1000 by 1000 array. The beginning of a record is illustrated along denoted lines 42 and begin with exposures, as shown by reference numerals 1, 2, 3, and 4 and continue to the right off the page, as shown in FIG. 1. The end of an example one hundred exposure record is shown along denoted lines 40 and contains exposures ending at position 100.

The first exposure 1, which is adjacent to a focus spot denoted by reference numeral 31 is resultant from an exposure by a spot far to the right having coordinates [11, 1] and the first exposure 1, which is adjacent to a focus spot denoted by reference numeral 32 is resultant from an exposure by a spot far to the right having coordinates [12, 11]. From this, one of ordinary skill in the art can understand why there are no exposures to the right of spots 21, 22, and 23. One of ordinary skill in the art can further realize that none of the top row of spots (i.e., having y coordinate of 1) ever have regions exposed to the right of them. Nor do any of the spots with an x coordinate of 1000 have exposures to the right of them. This is because fresh, unexposed film is entering from the right and moving left horizontally under configured lenslet spots of the present invention.

Figure 2:
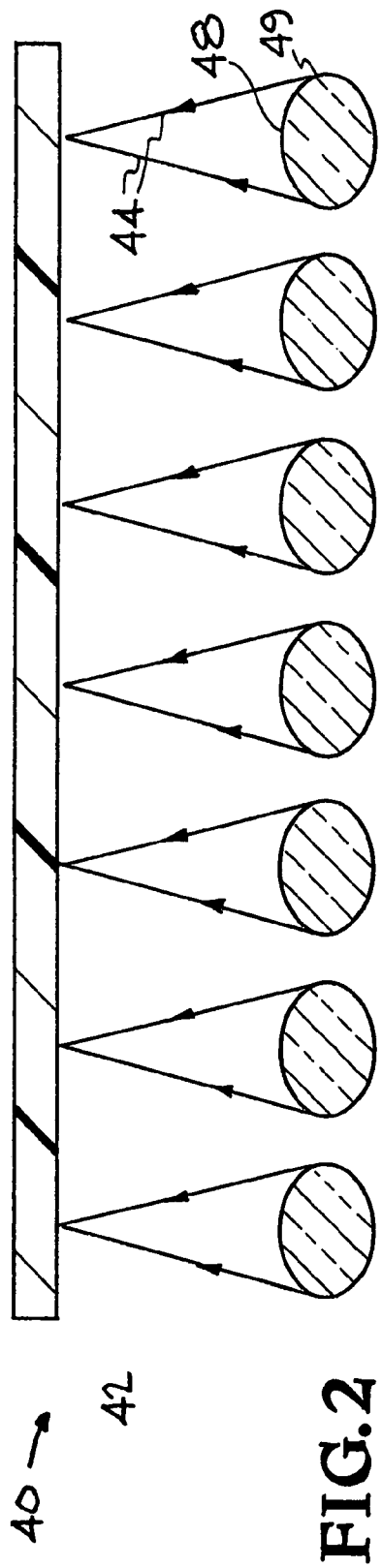
FIG. 2 shows a configuration wherein light entering the transmissive lenslet array of the present invention from the bottom concentrates light to expose a recording media.

FIG. 2 shows a configuration, generally designated by reference numeral 40, wherein light entering the transmissive lenslet array 49 (one referenced for simplicity) from the bottom concentrates light 44 by curved optical surfaces 48 (e.g., reflective, diffractive, but often refractive surfaces). The concentrated spots of light expose the recording media, in this example, an optically sensitive media 42, such as, but not limited to, a silver halide film, a dichromated gelatin, a photoresist, a semiconductor material, or photosensitive molecules deposited on the surface or otherwise forming the surface of a configured detector.

Figure 3:
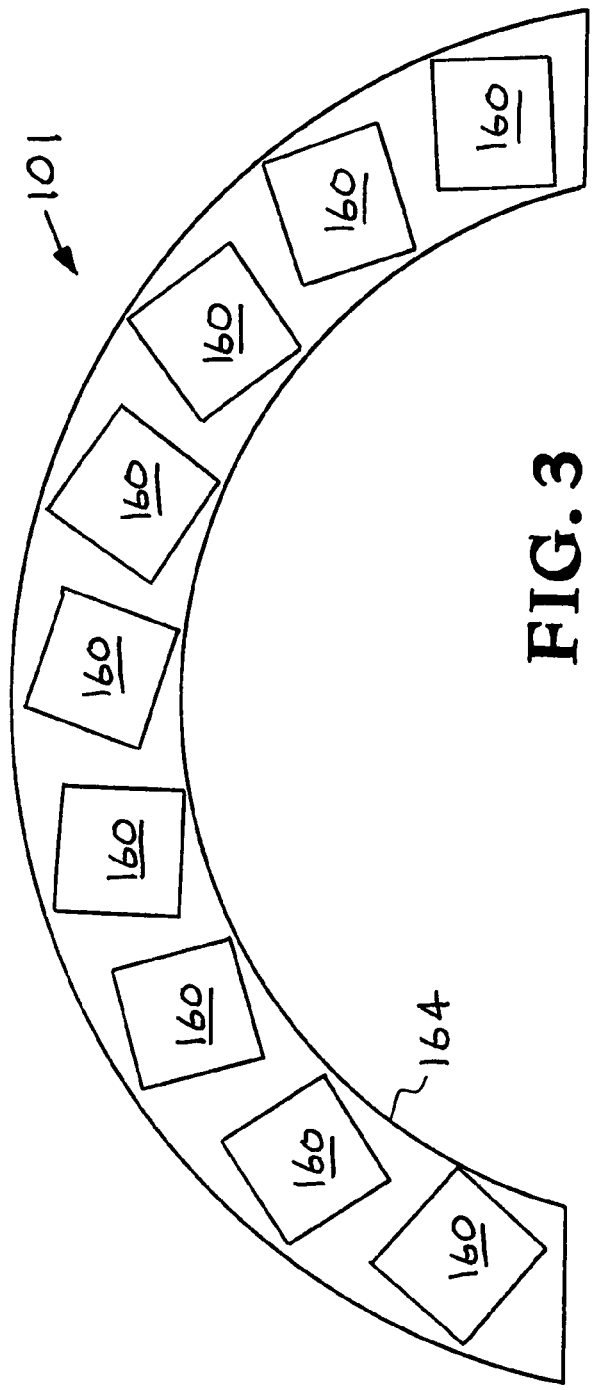
FIG. 3 illustrates how several images can be projected onto different regions of a spinning photosensitive media.

FIG. 3 shows a configuration, generally designated by reference numeral 101, wherein a plurality of optical elements 160, such as lenslet arrays, is configured above a spinning optically sensitive (photosensitive) media 164 having a predetermined rotational velocity. Each array thus exposes an area slightly larger than the array. Because of the streaking mechanism, the exposed region extends beyond the area by one over the linear concentration ratio. For example, if a 30 micron lenslet creates a 3 micron spot, the ratio of the diameters is 10 to 1. One over this concentration ratio of ten is ten percent. Thus, a 30 mm by 30 mm array approximately exposes a 30 mm by 33 mm region. The longer dimension is along the circumference of the recording plate. The required tilt (the same for each array relative to the tangential direction) and whether the recording of the arrays are in a particular sequence (or all in parallel) determines how many arrays can be placed and where. As another beneficial arrangement, the exposed region of configuration 101 can be post processed using developer and fixing agents while the media 164 is spinning so that the data resulting from the exposed regions can be readout by pausing the spinning media at a specific angular position and then front and/or back illuminating the developed regions so that the information can be imaged onto a detector, such as, but not limited to a CCD camera.

Figure 4:
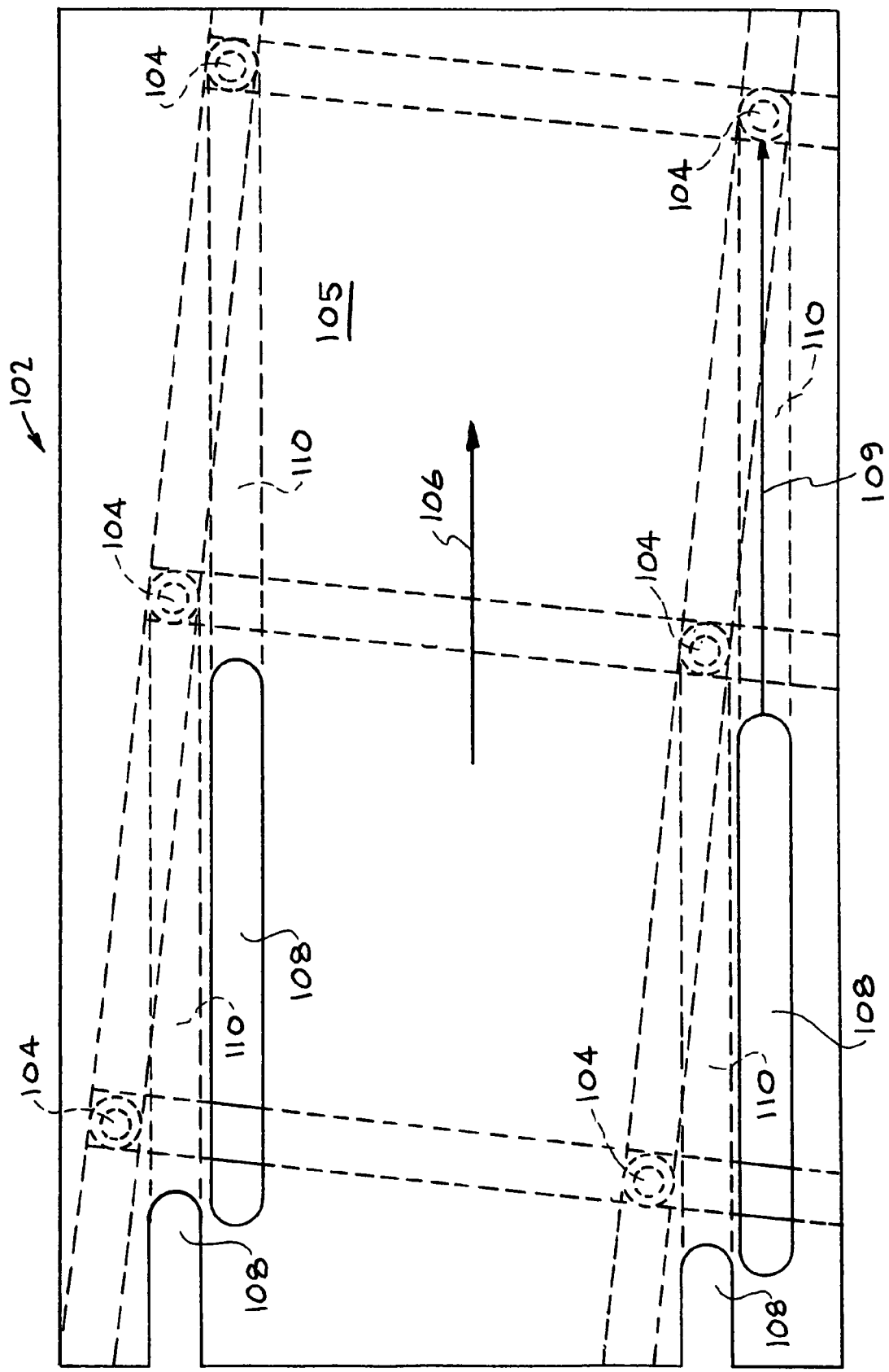
FIG. 4 illustrates how a fast moving slot of the present invention can be used to shutter light at the foci of configured lenslets.

FIG. 4 shows a configuration 102 wherein the light of each pixel is focused into spots 104 and is blocked by an opaque plate. 105 moving in a direction 106 which is at a designed angle (5.1° in this example) with respect to the spot array. There are a plurality of light transmitting openings 108, such as slots, in the plate 105, which begin to allow light through the plate 105 after having traversed along a path 109 during which time a region of the opaque plate 110 is being subjected to light from the spots as this region of the plate moves beneath the focus. As another embodiment opaque plate 105 can be configured with absorbing, reflecting, transmissive, and/or diffracting surfaces in lieu of slotted openings to also direct electromagnetic radiation to and away from the optically sensitive media. In the beneficial arrangement, however, the length and the velocity of the opening 108 determines the time interval light passes through the plate 105, wherein the surface of the plate is accelerated from zero velocity in a short space and time to a transition velocity, such a transition velocity enabling the opening or closing so as to produce a shutter-like system, much like a guillotine or scissor type closure mechanical shutter that has a fast transition between being fully open and fully closed. Each transition is determined by the velocity of the slot 108 edge as it crossed the spot 104 diameter.

Two counter propagating slots (moving with the same velocity) can also be used to double transition speed (shorten the time between open and closed states). This system can be designed to be rotating and phased to automatically provide sequential shuttering of separate arrays. An another beneficial embodiment, a piezotranslator (such as, but not limited to, a P-244.30 from Physik Instrumente) can be utilized to accelerate the plate 105 from zero velocity to about two meters per second in less than about 50 microseconds. Thus, for example, given a pre-trigger of about 50 microseconds, the slot 108 edge can traverse the spot 104 diameter having a diameter of about 2 microns, in one microsecond. At ten million frames per second, the first ten frames (each about 0.1 microseconds apart) can gradually have their transmittance go from zero to full open. In a 900 frame recording system this is not a significant issue.

A similar closing shutter can be located directly above or beneath the opening shutter just described. As another example embodiment, a closing shutter may be on a separate chip (not shown) in a separate location which is at a relay image plane of the plane of focal spots (relay optics may include either a low F# large aperture optics, holographic/diffractive optics, or lenslet arrays). The zero velocity "resting" state is open but can be accelerated over a short distance and within a short time (such as the 50 microseconds described earlier for the opening shutter). Proper timing of the opening and closing shutters can provide fast transitions and a predetermined exposure (open state). In an example case where the lengths of the acceleration region 110 and slot 108 exceeds the distance allowed (due to overlap with the next pixel), the opening gate starts closed and stops (decelerated back to zero velocity) in the an open state while the closing shutter starts in an open state, is accelerated to the fast "open to closed" transition, then stops in a closed state. This enables slot 108 to be substantially shortened to make the translations much shorter.

Thus far each pixel is described as being streaked across a stripe of film or other photosensitive material or detector. Assuming the illumination is not pulsed, then resultant stripes contain a smear of light spread over length with time. One can employ a pulsed light source (perhaps driven by a modulated laser) to get discrete exposures along the stripe path. This would appear as a series of dots or dashes along that path depending on the pulse frequency and duty cycle (ratio of the time light is present divided by the period). However, high power laser sources operating at 10 MHz are expensive, dangerous and often complex. One can use a high speed rotating chopper wheel with small holes or slots through which laser light is focused and repeatedly chopped by the wheel. This allows use of continuous wave (CW) lasers or long pulse lasers but the efficiency loss can be large (50% efficiency for a 50% duty cycle chopping pattern). Furthermore, other light sources may be present which add background noise or require narrow band filtering.

To get a modulated exposure without lasers one may also mask the recording media directly. One may employ a high-speed array of slots or holes moving transverse to the array of focal spots to chop the exposure times into discrete and separate regions. Both techniques allow for lower cost illumination with lamps, flashlamps, plasma arc lamps (such as the Megasun), and explosive light sources (such as the Argon candle).

Other MEMs shutters have been devised, including the FLIXEL which has less than about a one microsecond response time. One can tailor the transmittance of the shutter given knowledge about the event. For example, if one anticipates more light toward the end of the recording, such as, for example, from a fireball emerging from an exploding surface, then slots of the present invention are narrowed to pass less light so as to prevent over exposing a configured detector, e.g., film. As another arrangement, a dynamic shutter can be integrated to interactively respond to the light, shutting down to pass light when it detects an excess of photons and then opening up when there is less light from the object. Such an arrangement requires a very fast feedback mechanism and there may be a lag between detecting light intensity and reacting to it (controlling light transmission).

Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The invention claimed is:

1. A parallel scanning apparatus, comprising:
   optical means configured to convert a received two dimensional array of electromagnetic radiation resulting from a transient event into a two dimensional array of spots;
   an optically sensitive media configured coplanar with said two dimensional array of spots and further configured to be exposed in the plane of the array of said spots not along the direction of a row of said two-dimensional array of spots but along a tilt between said row and the surface of said optically sensitive media; and
   an interposed surface having an array of openings configured to move transverse to said two-dimensional array of spots so that the exposure of said optically sensitive media is controlled.

2. The apparatus of claim 1, wherein said predetermined tilt between said row and the surface of said optically sensitive media produces one or more tracks having a width of about a spot diameter so that said tracks fit between tracks generated by adjacent spots so that said tracks can be longer than the spacing between said spots and so that said tracks do not overlap.

3. The apparatus of claim 1 wherein said optical means comprises at least one light concentrating means selected from: a lenslet array, an array of fiber tapers, an array of hollow reflecting cones, an array of hollow reflecting pyramids, a hologram, and a diffractive device.

4. The apparatus of claim 3, wherein said microlens array comprises up to about one million lenslets.

5. The apparatus of claim 4, wherein each said lenslet concentrates light of one picture element that each individually makes up said two-dimensional array of said electromagnetic radiation to a spot smaller than about thirty microns.

6. The apparatus of claim 1, wherein said interposed surface is accelerated to a transition velocity, said transition velocity enabling an opening or closing of said openings to produce a shutter.

7. The apparatus of claim 6, wherein said produced shutter results in an aperture at least about ten times smaller in diameter than the spacing between said spots.

8. The apparatus of claim 6, wherein the time in which said shutter goes from fully closed to fully open is less than about two microseconds and the time in which the shutter goes from full open to fully closed is less than about two microseconds.

9. The apparatus of claim 6, wherein said interposed surface further comprises a pair of surfaces configured with slots to counter propagate with the same velocity so that said transition velocity can be doubled.

10. The apparatus of claim 9, wherein said slots are rotated and phased so that one or more separate arrays are sequential shuttered.

11. The apparatus of claim 1, wherein a piezoelectric is used to move said interposed surface.

12. The apparatus of claim 1, wherein said array of openings comprises at least one configuration selected from: slots and holes.

13. The apparatus of claim 1, wherein said optically sensitive media comprises at least one medium selected from: a silver halide film, a dichromated gelatin, a photo-resist, and a semiconductor material.

14. The apparatus of claim 1, wherein said electromagnetic radiation comprises visible light.

15. The apparatus of claim 14, wherein said electromagnetic radiation results from illumination directed from a laser source.

16. The apparatus of claim 1, wherein an inter-frame time comprising said two-dimensional array of spots is less than about one microsecond.

17. The apparatus of claim 1, wherein a relative motion between said optically sensitive media and said two-dimensional array of spots is greater than about six meters per second.

18. The apparatus of claim 1, wherein said exposed regions of said optically sensitive media results in data storage of greater than about ten gigabytes.

19. A parallel scanning apparatus, comprising:
optical means configured to convert a received two dimensional array of electromagnetic radiation resulting from a transient event into a two dimensional array of spots;
an optically sensitive media configured coplanar with said two dimensional array of spots and further configured to be exposed in the plane of the array of said spots not along the direction of a row of said two-dimensional array of spots but along a tilt between said row and the surface of said optically sensitive media; and
an interposed surface having an array of predetermined absorbing, reflecting, transmissive, and/or diffracting surfaces configured to move transverse to said two-dimensional array of spots so that the exposure of said optically sensitive media is controlled.

20. A parallel scanning apparatus, comprising:
optical means configured to convert a received two dimensional array of electromagnetic radiation resulting from a transient event into a two dimensional array of spots;
an optically sensitive media configured coplanar with said two dimensional array of spots and further configured to be exposed in the plane of the array of said spots not along the direction of a row of said two-dimensional array of spots but along a tilt between said row and the surface of said optically sensitive media, wherein said optically sensitive media is configured on a rotating disc so that one or more sets of data can be recorded via exposure from received said electromagnetic radiation.

21. The apparatus of claim 20, wherein said data is recorded near the periphery of said rotating disc to maximize the surface velocity relative to said two-dimensional array of spots.

22. A parallel scanning apparatus, comprising:
optical means configured to convert a received two dimensional array of electromagnetic radiation resulting from a transient event into a two dimensional array of spots;
an optically sensitive media configured coplanar with said two dimensional array of spots and further configured to be exposed in the plane of the array of said spots not along the direction of a row of said two-dimensional array of spots but along a tilt between said row and the surface of said optically sensitive media, wherein each said spot comprises a time varying intensity of one or more colors to enable the recording of one or more independent time-varying information streams of said transient event.

23. A parallel scanning method, comprising:
producing a two dimensional array of spots that comprises image information of a transient event(s);
exposing an optically sensitive media via said two dimensional array of spots not along the direction of a row of said two-dimensional array of spots but along a predetermined tilt between said row and the surface of said optically sensitive media; and
configuring said optically sensitive media on a rotating disc, wherein data is recorded via exposure from said two dimensional array of spots as said rotating disc spins at a predetermined velocity.

24. The method of claim 23, wherein after exposure, post processing steps are performed to develop said optically sensitive media while said rotating disc spins.

25. The method of claim 24, wherein said post processing steps comprise applying developer and fixing agents.

26. The method of claim 24, wherein readout of said data comprises: pausing said rotating disc at a specific angular position, applying front and/or back illumination of said developed optically sensitive media; and imaging said transient event(s) onto a detector.

27. A parallel scanning method, comprising:
producing a two dimensional array of spots that comprises image information of a transient event(s);
exposing an optically sensitive media via said two dimensional array of spots not along the direction of a row of said two-dimensional array of spots but along a predetermined tilt between said row and the surface of said optically sensitive media; and
configuring an interposed surface having an array of openings to move transverse to said two-dimensional array of spots so that the exposure of said optically sensitive media is controlled.

28. The method of claim 27, further comprising: moving said interposed surface to a transition velocity, said transition velocity enabling an opening or closing of said shutter.

29. The method of claim 28, wherein said interposed surface further comprises a pair of surface configured with slots to counter propagate with the same velocity so that said transition velocity can be doubled.

30. The method of claim 29, wherein said slots are rotated and phased so that one or more separate arrays are sequential shuttered.

* * * * *